March 28, 1967  H. BIEGLER ETAL  3,311,451
PRODUCTION OF FINELY DIVIDED AMORPHOUS SILICA
Filed June 29, 1964  2 Sheets-Sheet 2

INVENTORS
HANNS BIEGLER,
WALTER NEUGEBAUER,
HERBERT KEMPERS,
BY Bailey, Stephens & Huettig
ATTORNEYS 3,311,451
PRODUCTION OF FINELY DIVIDED AMORPHOUS SILICA
Hanns Biegler, Wesseling, near Cologne, Walter Neugebauer, Constance (Bodensee), and Herbert Kempers, Merten, Germany, assignors to Deutsche Gold- und Silber-Scheideanstalt vormals Roessler, Frankfurt am Main, Germany
Filed June 29, 1964, Ser. No. 378,868
Claims priority, application Germany, June 28, 1963, D 41,852
6 Claims. (Cl. 23—182)

The present invention relates to an improved process for the production of finely divided amorphous silica.

It is known that finely divided amorphous silica can be produced from silica containing materials by reaction of such materials with a reducing agent at high temperatures to form silicon monoxide in gaseous form and in some instances carbon monoxide in addition thereto and then oxidizing the gaseous silicon monoxide with an oxidizing gas to form silica. Quartz, for example, can be used as the silica containing material and coke as the reducing agent. The reduction itself can be carried out in an arc furnace. In such process the velocity of the gas leaving the furnace can be increased by a reduction in the size of the outlet opening and the oxidizing gas can be supplied in the form of several streams to the gaseous silicon monoxide after it has left the furnace with such a velocity, quantity and angle that the gas streams converge at approximately the same point about the silicon monoxide gas stream with intimate mixture therewith and that no appreciable portion or negative pressure occurs on the gas in the furnace and that the solid finely divided amorphous silica is subsequently separated from the carbon dioxide containing gas.

The particle size and surface area of the silica formed can be regulated by the velocity at which the reaction gas mixture leaves the furnace and the velocity, quantity and angle of incidence of the oxidizing gas. It is advantageous in such process to introduce the stream of the oxidizing gas into the rising stream of silicon monoxide upwardly at an angle of about 45° with respect to the transverse axis of such stream. Such angle, however, can be varied between 30° and less than 90°. In such process a large number of nozzles, for example, 50, are always used for the supply of the oxidizing gas streams.

This known process has been used with very good success as long as a reaction furnace was employed in which the outlet opening for the gaseous silicon monoxide and carbon monoxide mixture into the gas mixing chamber does not exceed about 5 cm. in diameter. This, for example, is the case with arc furnaces of capacities up to about 50 kilowatts. With larger furnaces, that is furnaces having larger capacities than 50 kilowatts, for example, 500 kilowatts and therefore possess an outlet opening of about 10 to 20 cm., the introduction of the oxidizing gas, especially at an angle of about 45°, causes an impedance of flow with the gas stream to take place which renders controlled attainment of the desired surface area in the silica produced impossible or in other words prevents a definite controlled oxidation of the silicon monoxide. In view of the conical shape of the air supplied for the oxidation, the gas stream leaving the furnace is blocked. Adequate permeation of the gas to be oxidized with the air no longer occurs. If such blocking is sought to be prevented by reducing the number of nozzles employed to supply the oxidizing air, the gas stream to be oxidized breaks out between the individual oxidizing air streams. As a result the oxidation progresses non-uniformly which becomes noticeable by the undesired wide distribution of the primary particle sizes obtained and no definitely controlled silica products can be obtained.

According to the invention it was found that the disadvantages indicated above in the process for the production of finely divided amorphous silicon dioxide described can be overcome if a portion of the oxidizing gas supplied to the silicon monoxide containing gas stream leaving the furnace is supplied in such a way that such silicon monoxide containing gas stream is enveloped and that an aspirating action on such gas stream is obtained, and the other portion of the oxidizing gas is supplied to such gas stream at a higher location in such a way that turbulence occurs in the entire gas mixture.

The silica product obtained can be separated off in the customary manner. In the process according to the invention, the silicon monoxide containing gases are supplied to the location of the oxidation in bundled form in which the prevention of a lateral break out of the flame is ensured. As the enveloping oxidizing gas in addition has an aspirating action upon the silicon monoxide containing gas stream leaving the furnace, an increase in velocity of such stream and a pressure release in the furnace chamber is achieved simultaneously.

The other portion of the oxidizing gas (usually compressed air) is introduced into the apparatus at a location above that at which the enveloped gas stream is introduced. Such other portion is introduced at such a pressure that as complete a turbulence as possible involving the enveloped gas stream and the later supplied oxidizing gas is attained. This causes a very rapid and complete oxidation of the silicon monoxide to silicon dioxide. The process according to the invention renders it possible to regulate the surface area as well as the particle size of the product without any limitation as to the dimensions of the furnace employed. For example, primary particle sizes of an average of 20 to 100 m$\mu$ and surface areas of 300 m.$^2$/g. to 150 m.$^2$/g. can be attained.

The silica used as starting material in the arc reduction process may, for example, be in the form of sand, quartz or mineral silicates. The reducing agent employed can, for example, be carbon, in the form of anthracite, coke, carbon black, or silicon or silicon carbide. Oxygen or preferably air can be used as the oxidizing gas.

Expediently in carrying out the process according to the invention the aspirating envelopment of the gas mixture leaving the reaction furnace is achieved by the introduction of a portion of the oxidizing gas required for the oxidation of the silicon monoxide to silicon dioxide through an annular nozzle which is arranged around the outlet opening for the gases leaving the furnace. In this way the velocity of the gas stream leaving the furnace is increased and the resulting enveloped gas stream reaches the location of oxidation in bundled form.

The remainder of the oxidizing gases required is supplied to such enveloped gas stream at raised pressures in a relatively small number of locations, preferably, in the form of several separate streams. Compressed air is preferably employed for this purpose. Such compressed air tears apart the enveloped gas column so that sufficient quantities of the oxidizing gas reach all the way into the center of the column. In view of the intimate mixture attained, a definite controlled combustion is attained. In contrast to the previously employed processes, it is not necessary to provide a very large number of, for example, 50, oxidizing gas streams. In the process according to the invention the supply of, for example, about 4 to 10 gas streams suffices. It is advantageous to introduce the few gas streams employed with about equidistant spacing circumferentially, preferably, however, in such a way that opposing streams are staggered with respect to each other. Furthermore, in contrast to the prior processes, the ignition preferably occurs practically horizontally or, in other words, at a 90° angle with respect to the longitudinal axis of the rising enveloped gas stream and if directed upwardly it should not be at an angle more than 30° from the horizontal.

According to a preferred embodiment of the process the envelopment of the rising silicon monoxide gas stream is effected by the tangential supply of a portion of the oxidizing gas. In this way a rotating envelope surrounds the rising gas stream which also causes an aspirating action. This action can be increased if this portion of the oxidizing gas is also passed through slightly angled guiding plates.

The introduction of the remaining portion of the oxidizing gas required for the turbulent mixture of the gases is effected as in the first embodiment. A particular advantage of the process according to the invention and especially in the preferred embodiment thereof is that the hot silicon monoxide containing gas mixture is prevented from contacting the air cooled metal parts of the apparatus so that condensation of the silicon monoxide thereon is prevented.

It is advantageous if the first portion of the oxidizing gas which is employed to envelope and aspirate the silicon monoxide containing gas rising from the furnace outlet be supplied in a quantity of about 100 to 500 m.³/h. at a pressure of 100 to 1000 mm. water column and the remaining portion of the oxidizing gas be supplied in a quantity of about 50 to 400 m.³/h. at a gauge pressure of about 2 to 6 atmospheres.

The indicated range of quantity and pressure for the oxidizing gas refers to the oxidation of a gas mixture made of 0.1–1 kilogram mol p./h. of silicon monoxide and carbon monoxide each.

In the accompanying drawings:

FIG. 3 is a vertical sectional view partly in elevation of a preferred embodiment of an arrangement for the supply of the oxidizing gas according to the invention.

Figure 1:
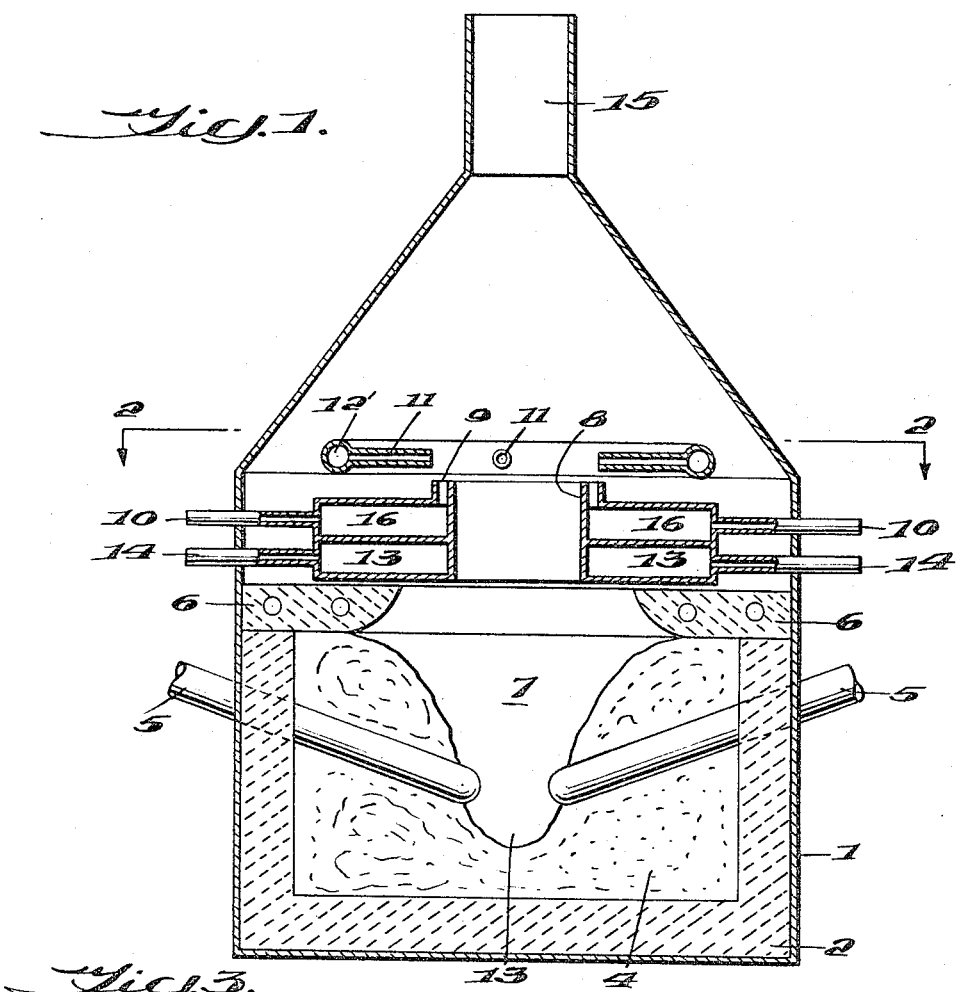
FIG. 1 shows a vertical sectional view partly in elevation of a circular furnace provided with an arrangement for supplying the oxidizing gas according to the invention.

The spacing between nozzles 9–11 in FIG. 1 as well as between the upper portion of chamber 16 and nozzles 11 in FIG. 3 is 5–30 millimeters approximately, preferably 15 millimeters.

Figure 2:
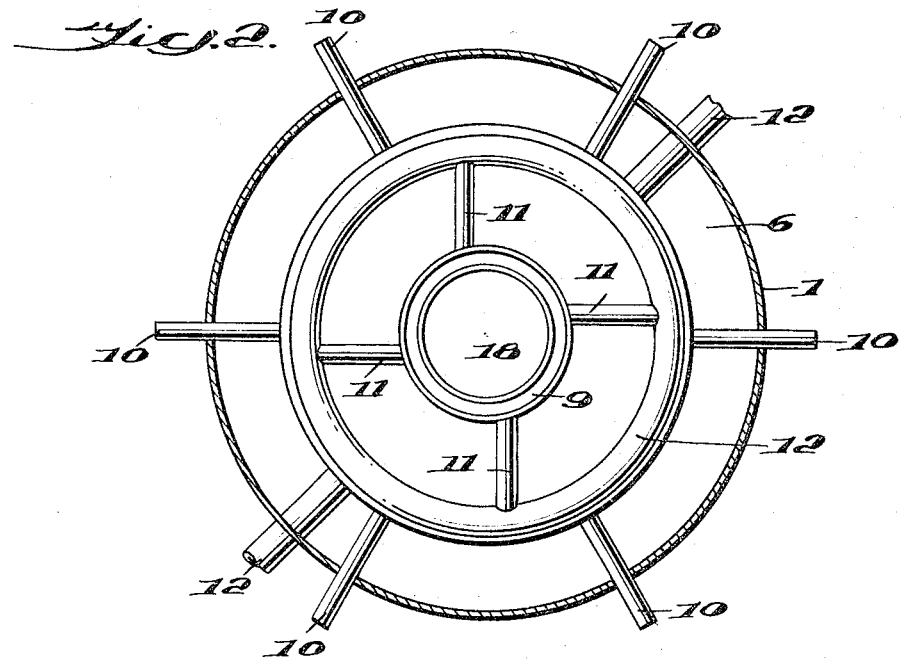
FIG. 2 is a sectional view partly in elevation taken along line 2—2 of FIG. 1 in the direction of the arrows.

The apparatus shown in FIGS. 1 and 2 comprises a circular furnace 1 provided with refractory lining 2 enclosing reaction chamber 3. Adjustable electrodes 5 are provided in the reaction chamber which also contains the starting mixture 4, for example, of sand and coke. The top of the furnace is provided with a water cooled cover member 6 which is provided with a centrally located outlet opening 7. The oxidizing gas supplying arrangement 8 is provided over cover member 6, having its centrally located opening 18 communicating with the opening 7 of the cover member. Opening 18 is about 10 to 20 cm. in diameter for a 500 kilowatt furnace. The water cooled oxidizing gas supplying arrangement 8 comprises annular chamber 16 provided with an annular nozzle opening 9 and oxidizing gas supply tubes 10 for supplying the first portion of oxidizing gas so as to envelope and aspirate the silicon monoxide containing gas rising through opening 18, water cooled chamber 13 provided with water supply tubes 14 and oxidizing gas supply nozzles 11 which are supplied with oxidizing gas over circular conduit 12' and supply conduits 12. Nozzles 11 which supply the remaining portion of the oxidizing gas can be of a diameter between 4 and 10 mm., preferably about 8 mm., for a 500 kilowatt furnace. As can be seen from FIG. 2, the opposing nozzles 11 are slightly displaced (staggered) with respect to each other. The top of the furnace is provided with conduit 15 serving to carry away the gases containing the finely divided amorphous silica produced.

Figure 4:
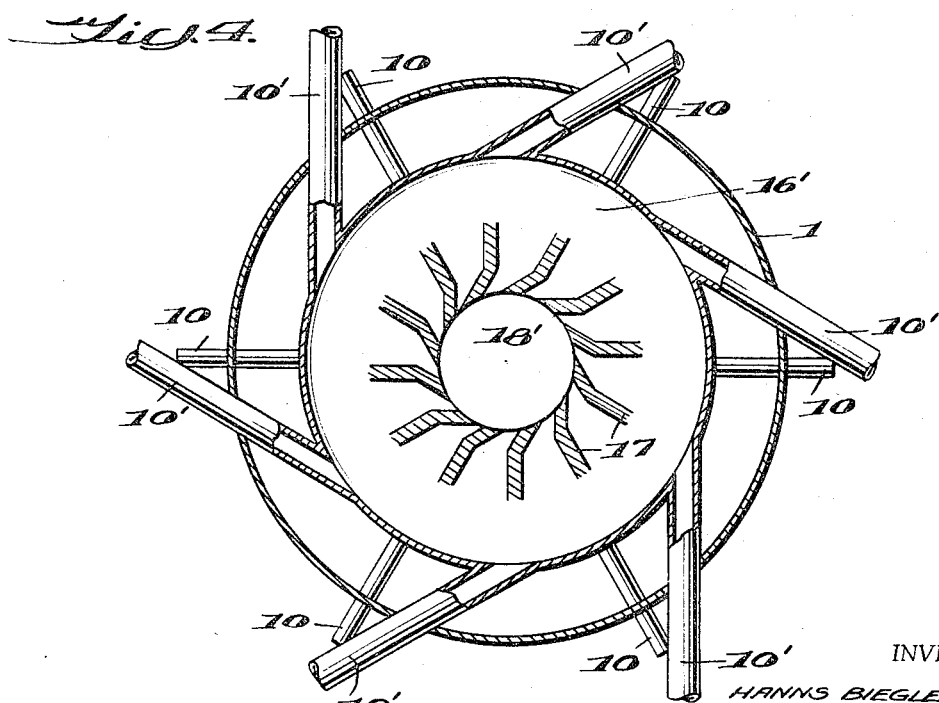
FIG. 4 is a sectional view partly in elevation taken along line 4—4 of FIG. 3 in the direction of the arrows.

In the oxidizing gas supply arrangement shown in FIGS. 3 and 4, nozzles 11 and gas supply conduits 12 and 12' as well as the water cooled chamber 13 and supply conduits 14 are the same as in the apparatus shown in FIGS. 1 and 2. On the other hand, the arrangement for supplying the first portion of the oxidizing gas comprises the annular chamber 16', which if desired can also be open at the top, tangential oxidizing gas supply conduits 10' and slightly angled guiding plates 17 whose inner ends define the opening 18'.

The following examples will serve to illustrate the process according to the invention.

*Example 1*

An apparatus analogous to that disclosed in FIGS. 1 and 2 was employed. The furnace was a 500 kilowatt hour 3 phase arc furnace and as an average produced 0.9 kilogram mol of silicon monoxide and 0.9 kilogram mol of carbon monoxide per hour. The opening (18) provided by the oxidizing gas supply arrangement was 100 mm. 400 Nm.³/h. of air at a pressure of 700 mm. water column were supplied through annular nozzle (9) so as to envelope the gaseous silicon monoxide and carbon monoxide leaving the furnace and 350 Nm.³/h. of air at a gauge pressure of 4 atmospheres were injected horizontally into the rising enveloped gas stream through 6 nozzles (11) 6 mm. in diameter. The injected air caused such turbulent mixture of the gases that the resulting particles of silica produced were of controlled definite size (90% of a diameter within the range of 8–28 m$\mu$ with a BET surface area of 282 m.²/g.±25 m.²/g).

*Example 2*

A mixture of silicon monoxide and carbon monoxide was produced in a 500 kilowatt hour electric arc furnace as in Example 1, but such gas mixture was oxidized to silica and carbon dioxide with the aid of an oxidizing gas supply arrangement as shown in FIGS. 3 and 4. The diameter of the opening (18') defined by the inner ends of the guiding plates (17) was 110 mm. 550 Nm.³/h. of air at a pressure of 600 mm. water column were supplied through annular chamber (16) over 14 guiding plates (17) to envelope the rising mixture of gaseous silicon monoxide and carbon monoxide leaving the furnace with a rotating envelope. 300 Nm.³/h. of air at a gauge pressure of 4 atmospheres were injected horizontally into the rising enveloped gas stream through 4 nozzles (11) 8 mm. in diameter. The injected air caused such turbulence that 90% of the silica particles produced were of a diameter within the range of 8–35 m$\mu$ with a specific surface area of 263 m.²/g.±25 m.²/g.

We claim:

1. In the method of producing finely divided amorphous silica by reacting a silica containing material with a reducing agent in an electric arc furnace to produce a stream of gaseous silicon monoxide and oxidizing the gaseous silicon monoxide in the stream leaving the furnace with an oxidizing gas to form the finely divided amorphous silica, the steps of enveloping said stream of gaseous silicon monoxide after it has left the furnace with an aspirating envelope of a portion of the oxidizing gas to increase the velocity of such gas stream leaving the furnace and thereafter injecting the remainder of the oxidizing gas into such enveloped stream to cause turbulent mixture of the entire gas mixture.

2. The method of claim 1 in which the gaseous silicon monoxide stream leaving the furnace is directed vertically upwards.

3. The method of claim 2 in which said enveloping portion of the oxidizing gas is supplied upwardly through an annular nozzle surrounding the gaseous silicon monoxide stream leaving the furnace.

4. The method of claim 2 in which said enveloping portion of the oxidizing gas is supplied tangentially to said gaseous silicon monoxide stream leaving the furnace to provide a rotating envelope surrounding such stream.

5. The method of claim 2 in which the remainder of the oxidizing gas is injected into said enveloped gas stream in the form of about 4 to 10 separate streams under a gauge pressure of about 2 to 6 atmospheres at an angle between 0° and 30° upwardly from the horizontal.

6. The method of claim 2 in which the reducing agent is a carbonaceous reducing agent and about 1 kilogram mol per hour of each of gaseous silicon monoxide and carbon monoxide are produced in the first reaction and air is employed as the oxidizing gas and in which the portion of air supplied to envelope the upwardly rising gaseous silicon monoxide containing stream is supplied in a quantity of 100 to 500 m.$^3$/h. at a pressure of about 100 to 1000 mm. water column and the remaining portion of the air is injected into the enveloped gaseous silicon monoxide containing stream in a quantity of about 50 to 400 m.$^3$/h. at a gauge pressure of 2–6 atmospheres.

References Cited by the Examiner

UNITED STATES PATENTS

| | | | |
|---|---|---|---|
| 2,428,178 | 9/1947 | Reik et al. | 23—182 |
| 2,573,057 | 10/1951 | Porter | 23—182 |
| 2,863,738 | 12/1958 | Van Antwerp | 23—182 X |
| 2,890,929 | 6/1959 | Rommert | 23—1 |
| 3,047,371 | 7/1962 | Krause et al. | 23—277 |
| 3,085,865 | 4/1963 | Long et al. | 23—277 |

FOREIGN PATENTS 655,647  7/1951  Great Britain.

OSCAR R. VERTIZ, *Primary Examiner.*

A. GREIF, *Assistant Examiner.*